United States Patent

Monnier

[11] Patent Number: 5,835,247
[45] Date of Patent: Nov. 10, 1998

[54] DEVICE FOR THE FOLDING OF THE OPTICAL PATHS OF TWO RIGHT-HAND AND LEFT-HAND IMAGE PROJECTORS OF A BINOCULAR HELMET VISOR WITH PROJECTION ON VISOR

[75] Inventor: Laurent Monnier, Bordeaux, France

[73] Assignee: Sextant Avionique, Velizy Villacoublay, France

[21] Appl. No.: 597,172

[22] Filed: Feb. 6, 1996

[30] Foreign Application Priority Data

Feb. 7, 1995 [FR] France ................................ 95 01386

[51] Int. Cl.⁶ .............................. G03H 1/00; G02B 5/32; G09G 5/00
[52] U.S. Cl. .............................. 359/13; 359/15; 359/630; 359/634; 345/7; 345/8
[58] Field of Search ................................ 359/13, 14, 15, 359/462, 464, 465, 466, 409, 410, 630, 634; 345/7, 8

[56] References Cited

U.S. PATENT DOCUMENTS

| | | | |
|---|---|---|---|
| 4,897,715 | 1/1990 | Beamon | 359/900 |
| 5,050,962 | 9/1991 | Monnier et al. | 359/13 |
| 5,157,548 | 10/1992 | Monnier et al. | 359/13 |
| 5,187,597 | 2/1993 | Kato et al. | 359/22 |
| 5,396,349 | 3/1995 | Roberts et al. | 359/14 |
| 5,453,877 | 9/1995 | Gerbe et al. | 359/13 |

FOREIGN PATENT DOCUMENTS

A-0 252 200  1/1988  European Pat. Off. .
A-0 288 365  10/1988  European Pat. Off. .

*Primary Examiner*—Jon W. Henry
*Assistant Examiner*—Audrey Chang
*Attorney, Agent, or Firm*—Oblon, Spivak, McClelland, Maier & Neustadt, P.C.

[57] ABSTRACT

A display system for a binocular helmet visor having image projectors projecting images on a semi-reflecting internal wall of the visor of the helmet. One image faces the right eye and another image faces the left eye. The shape of the surface of the internal wall of the visor makes it desirable to cross the optical paths of the two projectors at the helmet wearer's forehead in order to limit the deformation of the images. The optical paths of the two projectors are folded with holographic mirrors in a manner which results in a compact structure, reducing the space required for the visor and the overall weight of the helmet.

3 Claims, 1 Drawing Sheet

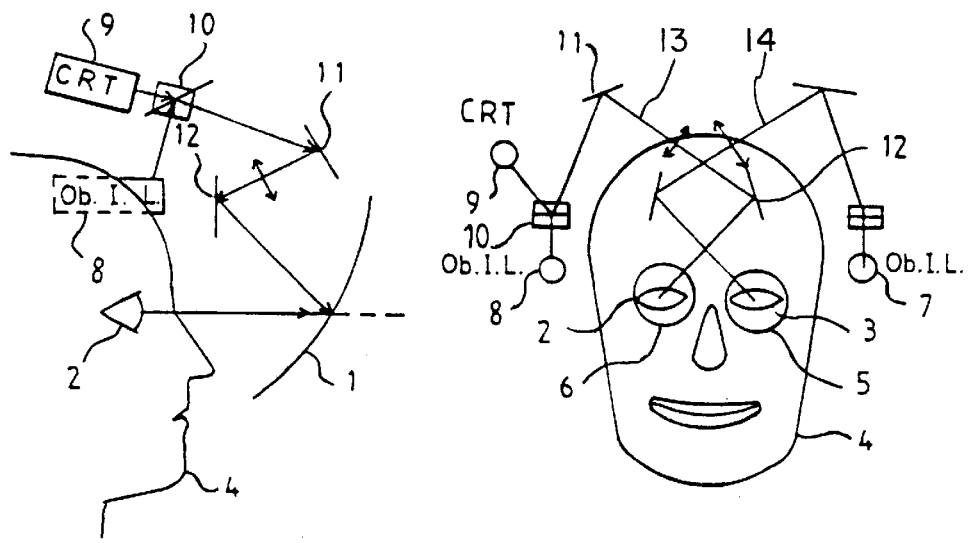
FIG.1
PRIOR ART
FIG.2
PRIOR ART
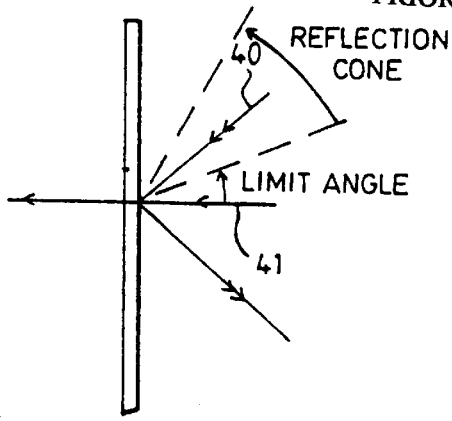
FIG.5
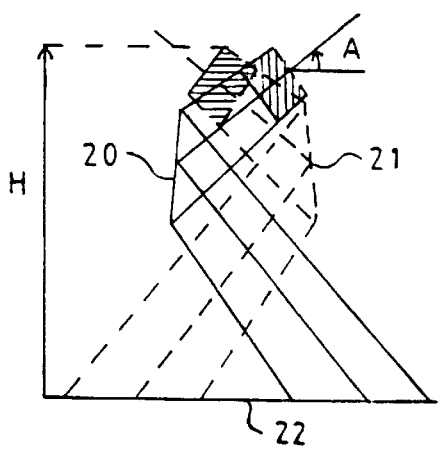
FIG.3
PRIOR ART
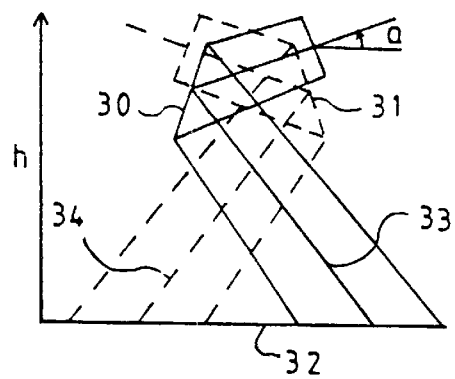
FIG.4

DEVICE FOR THE FOLDING OF THE OPTICAL PATHS OF TWO RIGHT-HAND AND LEFT-HAND IMAGE PROJECTORS OF A BINOCULAR HELMET VISOR WITH PROJECTION ON VISOR

BACKGROUND OF THE INVENTION

The present invention relates to binocular helmet visors with projections on the visors. These visors have two image projectors, each projecting an image on the semi-reflective internal wall of the visor of a helmet, one before the helmet wearer's right eye and the other before his left eye. These two image projectors convey images before the helmet wearer's eyes from the image sources which are either provided, with light intensifier devices, symbol generators, or both, placed on the side of the helmet so as not to encroach on the visual field of the helmet. To do this, they have optical paths or channels in canted-off lines that go around the helmet wearer's temple and forehead and must be shortened to the greatest extent possible in order to reduce the weight and unbalance of the helmet that is fitted out with the binocular visor.

Due to the concave shape of the internal wall of the visor pointed towards the center of the helmet, the planes of symmetry of the optical projection systems, that are defined by the sighting axis passing through each eye of the observer and that comprise the center of curvature of the internal visor, are not vertical but inclined and intersect in the sagittal plane at the helmet wearer's forehead. To restrict the length of the optical paths of the two projectors, it is possible to conceive of not correcting this intersection so that the projector projecting an image intended for the right eye will have an image source placed to the left of the helmet wearer's head and the projector projecting an image intended for the left eye will have an image source placed to the right of the helmet wearer's head. However, this arrangement is unacceptable for obtaining an intensified binocular image, for each eye must receive an intensified image coming from a view picked up from its side in order to preserve a stereoscopic effect with the same direction and to avoid problems in the perception of relief and distances. It is therefore necessary to uncross the optical paths of the two projectors by means of folds. These folds are usually obtained by means of a pair of ordinary, mirrors that are tilted and positioned so as to be facing each other, symmetrically with respect to the sagittal plane, at the height of the helmet wearer's forehead. It then becomes necessary, for the positioning of the mirrors, to see to it that the mirror folding one optical path will not intercept the other optical path and vice versa. This implies free spaces between the mirrors that increase the lengths of the optical paths and the height of the device, and have a detrimental effect on the weight of the device and the unbalance of the helmet.

SUMMARY OF THE INVENTION

The present invention is aimed at overcoming this drawback.

It is also aimed at giving a minimum length and maximum compactness to the optical paths of the image projectors of the visor.

An object of the invention is a device for the folding of the optical paths of the right-hand and left-hand images of a binocular helmet visor with projection on the visor, that intersect each other before reaching semi-reflective regions of the internal wall of the visor of the helmet, facing the helmet wearer's eyes, when said device comprises a pair of holographic mirrors, each receiving one of the optical paths at an angle of incidence close to the normal, smaller than its limit angle of reflection so that it allows itself to be crossed by this path and receiving the other optical path at a mean angle of incidence included in its reflection cone so that it reflects it and folds it before it reaches the internal wall of the visor.

According to another characteristic of the invention, the holographic mirrors are placed so as to be facing each other, symmetrically with respect to the sagittal plane, at the height of the helmet wearer's forehead, with a tilt from the normal towards the bottom of the sagittal plane.

BRIEF DESCRIPTION OF THE DRAWINGS

Other features and advantages of the invention shall emerge from the description of an embodiment given by way of an example. This description is given here below with reference to the accompanying drawings, wherein:

FIGS. 1 and 2 give a schematic front view and side view of the optical paths of two right-hand and left-hand image projectors of a binocular helmet visor with projection on visor;

FIG. 3 is a diagram illustrating the usual way of achieving the folds in the optical paths necessitated by their intersection before they reach the visor;

FIG. 4 is a drawing illustrating the novel way, according to the invention, of achieving the folding of the optical paths necessitated by their intersection before they reach the visor; and FIG. 5 is a drawing illustrating the properties of reflection and transmission of a holographic mirror.

DETAILED DESCRIPTION OF THE PREFERRED EMBODIMENTS

FIGS. 1 and 2 illustrate the configurations of the optical paths 13 and 14 of the two right-hand and left-hand image projectors used in a binocular helmet visor with projection on visor. The two image projectors are used to project an image on the inner wall of the visor 1, one before the right eye 2 and the other before the left eye 3 of the helmet wearer 4. The images are formed in the semi-transparent regions of the visor 1 that face the helmet-wearer's eyes. The outlines of these semi-transparent regions, referenced 5 and 6, are seen in FIG. 2. They come from light intensifier tubes I.L. placed behind objectives Ob. 7 and 8 positioned laterally outside the helmet wearer's field of vision and, possibly, a cathode-ray tube (CRT) symbol generator 9. They follow optical paths or channels in canted-off lines that are illustrated by lines in the figure and go around the wearer's temples and forehead while remaining as close as possible to the helmet-wearer's head to reduce the unbalance to the minimum and remaining as short as possible to reduce the weight of the visor.

As can be seen in FIG. 1, the optical path followed by the image of the projector assigned to the right eye 2 starts from an objective fitted into a light intensifier tube 8 and from a CRT symbol generator 9 whose images are superimposed in a combiner 10 placed in the vicinity of the helmet wearer's right-hand temple. It then rises along the helmet wearer's right-hand temple up to a reflection-folding mirror 11 that reorients it downwards, towards the space located beneath the visor before the right-hand part of the helmet-wearer's forehead. There, it encounters a second reflection-folding mirror 12 that finally sends it on to the internal wall of the visor in the semi-transparent region 6 facing the helmet wearer's right eye 2. Different optical systems are distributed along this path to make the beam keep a minimum section and to see to it that a collimated image appears on the visor. The optical path followed by the image of the projector assigned to the left eye 3 is symmetrical, with respect to the sagittal plane, to the path followed by the image of the projector assigned to the right eye 2.

The regions 5 and 6 of the internal wall of the visor where the images are projected are not planar but concave, pointed towards the center of the helmet. This leads to a deformation of the images which, furthermore, needs to be compensated for. To reduce this deformation to the minimum, these regions should be approached in directions that are as close as possible to their centers of curvature. This means illuminating the region 5 before the helmet wearer's left eye by the right and the region 6 before the helmet wearer's right eye by the left and, consequently, it means crossing the optical paths of the two projectors at the helmet wearer's forehead. This is done, as shown in FIG. 3, by means of two simple mirrors 20, 21 placed so as to be facing each other, symmetrically with respect to the sagittal plane, and inclined slightly downwards with respect to the vertical. As can be seen in FIG. 3, the drawback of these mirrors 20 and 21 lies in an increase in the amount of space taken up by the optical systems. This increase in space is caused by the increase in focal length due to the angular deflections that are necessary to obtain a space between the mirrors that would be sufficient for the mirror folding an optical path that starts from the inner wall 22 of the visor not to intercept the other optical path and vice versa.

To minimize the increase of the optical path entailed by the uncrossing of the two image projectors, it is proposed, in accordance with FIG. 4, to use holographic mirrors 30, 31. These holographic mirrors have the particular feature, as shown in FIG. 5, of having a reflection cone that permits a minimum limit angle below which they allow themselves to be crossed with minimum loss. Thus, they reflect the light rays reaching them with a mean angle of incidence of the order of 45 degrees such as the light ray 40 while at the same time allowing themselves to be crossed by the light rays, such as the light ray 41, reaching them at an angle of incidence close to the normal. Through this property, it is possible to envisage placing the holographic mirror that folds an optical path on the trajectory of the other path provided that the other optical path arrives at an angle of incidence that is small enough with respect to the normal for it to be not in its reflection cone. This is what is shown in FIG. 4 where it can be seen that each optical path 33 and 34 respectively, starting from the internal wall 32 of the visor, arrives firstly at a first holographic mirror 30 and 31 respectively at a mean angle of incidence included in the reflection cone of this first mirror, is reflected and then falls on the second holographic mirror 31, 30 respectively at an angle of incidence close to the normal, smaller than the limit angle in such a way that it crosses it.

From a comparison of the two FIGS. 3 and 4, it can be seen that the use of holographic mirrors enables the shortening of the optical paths by the distance hatched in FIG. 3, the reducing of the height of the device and the inclination of the optical paths after their uncrossing, thus enabling a reduction of the heightwise space requirement of the binocular helmet.

The approach using holographic mirrors, as compared with an approach using semi-transparent mirrors, provides a major gain in photometrical yield since it makes it possible to hope for a minimum photometric yield of 80% instead of 25%.

What is claimed is:

1. A device for folding first and second light generated by a light source before reaching semi-reflective regions viewable by a helmet wearer on an internal wall of a helmet visor, said device comprising:

a first holographic mirror which is configured to receive the second light at a mean angle of incidence sufficiently small to permit the second light to pass through said first holographic mirror, receives the first light at a mean angle of incidence sufficiently large to cause the first light to be reflected by said first holographic mirror, and folds the first light before the first light reaches the internal wall of the helmet visor; and a second holographic mirror which is configured to receive the first light at a mean angle of incidence sufficiently small to permit the first light to pass through said second holographic mirror, receives the second light at a mean angle of incidence sufficiently large to cause the second light to be reflected by said second holographic mirror, and folds the second light before the second light reaches the internal wall of the helmet visor.

2. The device according to claim 1, wherein the first and second holographic mirrors face each other symmetrically with respect to the sagittal plane of the helmet wearer.

3. The device according to claim 2, wherein the first and second holographic mirrors tilt toward the bottom of the sagittal plane of the helmet wearer.

* * * * *